US008406559B2

(12) United States Patent
Wu

(10) Patent No.: US 8,406,559 B2

(45) Date of Patent: Mar. 26, 2013

(54) METHOD AND SYSTEM FOR ENHANCING IMAGE SHARPNESS BASED ON LOCAL FEATURES OF IMAGE

(75) Inventor: Hung Chu Wu, Hsinchu (TW)

(73) Assignee: Orise Technology Co., Ltd., Hsinchu Science Park (TW)

( * ) Notice: Subject to any disclaimer, the term of this patent is extended or adjusted under 35 U.S.C. 154(b) by 98 days.

(21) Appl. No.: 12/929,909

(22) Filed: Feb. 24, 2011

(65) Prior Publication Data

US 2012/0106836 A1 May 3, 2012

(30) Foreign Application Priority Data

Nov. 2, 2010 (TW) ................................ 99137606 A

(51) Int. Cl.
*G06K 9/40* (2006.01)
*G06K 9/20* (2006.01)

(52) U.S. Cl. ......................... 382/274; 382/266; 382/283

(58) Field of Classification Search .................. 382/254, 382/260, 263, 264, 266, 283; 348/625, 627, 348/597, 606–610
See application file for complete search history.

(56) References Cited

U.S. PATENT DOCUMENTS 5,231,677 A * 7/1993 Mita et al. ..................... 382/266
5,896,469 A * 4/1999 Murakami .................... 382/266
6,115,078 A * 9/2000 Kino ............................ 348/625
6,393,148 B1 * 5/2002 Bhaskar ........................ 382/169
6,580,825 B2 * 6/2003 Bhaskar ........................ 382/169
7,613,363 B2 * 11/2009 Platt et al. ..................... 382/299
2002/0039152 A1 * 4/2002 Choi ............................ 348/678
2002/0081022 A1 * 6/2002 Bhaskar ........................ 382/162
2003/0189655 A1 * 10/2003 Lim et al. ..................... 348/241
2006/0007497 A1 * 1/2006 Yokochi ....................... 358/3.27
2007/0036456 A1 * 2/2007 Hooper ......................... 382/274
2007/0041636 A1 * 2/2007 Yoon et al. .................... 382/169
2008/0101716 A1 5/2008 Ho

* cited by examiner

*Primary Examiner* — Andrae S Allison

(74) *Attorney, Agent, or Firm* — Bacon & Thomas, PLLC

(57) ABSTRACT

A system for enhancing image sharpness includes a minimum unit, a maximum unit, a subtraction unit, a local mean unit, a sharpness calculation unit and a sharpness processing unit. The minimum unit receives pixels in a local area of an image to output a minimum luma value. The maximum unit receives the pixels in the local area of the image to output a maximum luma value. The subtraction unit subtracts the minimum luma value from the maximum luma value to generate a difference value. The local mean unit calculates an average of the luma values in the local area to generate a local mean value. The sharpness calculation unit calculates a sharpness factor for a pixel based on the difference value and an adjustable coefficient. The sharpness processing unit performs a sharpness processing on the pixel according to the sharpness factor and the local mean value.

11 Claims, 5 Drawing Sheets

| | | |
|---|---|---|
| 0 | -1 | 0 |
| -1 | A+4 | -1 |
| 0 | -1 | 0 |

| | | |
|---|---|---|
| -1 | -1 | -1 |
| -1 | A+8 | -1 |
| -1 | -1 | -1 |

FIG. 1 (Prior Art)

| | | |
|---|---|---|
| (i-1,j-1) | (i-1,j) | (i-1,j+1) |
| (i,j-1) | (i,j) | (i,j+1) |
| (i+1,j-1) | (i+1,j) | (i+1,j+1) |

FIG. 3

```
architecture rtl of min_search is
  type piexl_array is array(8 downto 0) of std_logic_vector(7 downto 0);
process(clk, rst)
 sinal  piexl_tmp: piexl_array;
 variable v :std_logic_vector(7 downto 0)
 begin
  if(rst='1') then
   for i in 8 downto 0 loop
    piexl_tmp(i) := "00000000";
   end loop;
  elsif(clk='1' and clk'event) then
   piexl_tmp(0) <= piexl_in0;
   piexl_tmp(1) <= piexl_in1;
   piexl_tmp(2) <= piexl_in2;
   piexl_tmp(3) <= piexl_in3;
   piexl_tmp(4) <= piexl_in4;
   piexl_tmp(5) <= piexl_in5;
   piexl_tmp(6) <= piexl_in6;
   piexl_tmp(7) <= piexl_in7;
  end if;

  if(rst='1') then
   v:='0';
  elsif(clk='1' and clk'event) then
   for j in 0 to 7 loop
    if (conv_integer(pixel(j) )< conv_integer(piexl(j+1))) then
     V := pixel(j);
    else
     V := pixel(j+1);
    end if;
   end loop;
  end if;
 min <= v;
end process;
end rtl;
```

FIG. 4

METHOD AND SYSTEM FOR ENHANCING IMAGE SHARPNESS BASED ON LOCAL FEATURES OF IMAGE

BACKGROUND OF THE INVENTION

1. Field of the Invention

The present invention relates to the technical field of image processing and, more particularly, to a method and system for enhancing image sharpness based on local features of image.

2. Description of Related Art

The sharp change in edges and/or grey scales of an image mostly corresponds to the high frequency components of the image. A high-pass filter is typically used to enhance image sharpness. Namely, with the high pass filter, the low frequency components of the image are attenuated without interfering in the high frequency components.

However, as the use of high pass filter only may attenuate the low frequency components of the image, it leads to an image distortion. To overcome this, prior art uses an unsharp masking to enhance the image sharpness, and in this case the unsharp masking subtracts an unclear version from the original image to thereby obtain a sharpened image. The unsharp masking can be expressed as follows.

$$f_S(x,y)=f(x,y)-\bar{f}(x,y), \quad (1)$$

where f(x, y) indicates an original image or an image before the unsharp masking, $\bar{f}(x,y)$ indicates an unclear version of the original image, and $f_S(x,y)$ indicates an image after the unsharp masking.

A high-boosting filtering is a next generation of the unsharp masking. The high-boosting filtering image is defined as:

$$f_{hb}(x,y)=A\times f(x,y)-\bar{f}(x,y), \quad (2)$$

where A is greater than or equal to one, f(x,y) indicates an original image or an image before the unsharp masking, $\bar{f}(x,y)$ indicates an unclear version of the original image, and $f_{hb}(x,y)$ indicates a high-boosting filtered image. The high-boosting filtered image $f_{hb}(x,y)$ can be rewritten as:

$$f_{hb}(x,y)=(A-1)\times f(x,y)+f(x,y)-\bar{f}(x,y). \quad (3)$$

From equation (3), equation (1) can be rewritten as:

$$f_{hb}(x,y)=(A-1)\times f(x,y)+f_S(x,y). \quad (4)$$

In this case, the high boosting filtering can be implemented by the masks in FIG. 1. When A=1, the high boosting filtering is similar to a Laplacian sharpening. When A is greater than one and increased more and more, the contribution of sharpening process is decreased less and less. When A is sufficiently big, the high-boosting filtered image can be considered as a value of the original image multiplying a constant.

No matter for the Laplacian sharpening, the unsharp masking, or the high-boosting filtering, it requires nine multipliers and eight adders for performing a masking operation, which costs very high in hardware and does not meet with the practical requirement.

Therefore, it is desirable to provide an improved method and system for enhancing image sharpness based on local features of image to mitigate and/or obviate the aforementioned problems.

SUMMARY OF THE INVENTION

The object of the present invention is to provide a method and system for enhancing image sharpness based on local features of image, which provides a simple method and system without the unsharp masking for enhancing the image sharpness, and generates different sharpness factors based on the content differences of local areas of the image to thereby avoid over-sharpening or under-sharpening, and eliminate the problem of requiring a large number of hardware in the prior art.

According to one aspect of the invention, there is provided a method for enhancing image sharpness based on local features of image, which performs a sharpness enhancement operation on an image formed of pixels, each having a luma value, arranged in a matrix form. The method comprises the steps of: (A) extracting local features of a local area including a pixel in the image for finding a maximum luma value and a minimum luma value in the local area to accordingly calculate a difference value between the maximum luma value and the minimum luma value, and a local mean value; (B) calculating a sharpness factor for the pixel according to the difference value; (C) performing a sharpness processing on the pixel according to the sharpness factor; and (D) repeating steps (A), (B), and (C) until the sharpness processing is performed on all pixels of the image completely.

According to another aspect of the invention, there is provided a system for enhancing image sharpness based on local features of image, which performs a sharpness enhancement operation on the image formed of pixels, each having a luma value, arranged in a matrix form. The system comprises: a buffer for temporarily storing luma values of a local area in the image, wherein the local area includes a pixel; a minimum unit connected to the buffer for receiving the luma values of the local area so as to output a minimum luma value of the local area; a maximum unit connected to the buffer for receiving the luma values of the local area so as to output a maximum luma value of the local area; a subtraction unit connected to the minimum unit and the maximum unit for subtracting the minimum luma value from the maximum luma value so as to generate a difference value; a local mean unit connected to the buffer for calculating an average of the luma values of the local area so as to output a local mean value; a sharpness calculation unit connected to the subtraction unit for calculating a sharpness factor for the pixel based on the difference value and an adjustable coefficient; and a sharpness processing unit connected to the buffer, the local mean unit and the sharpness calculation unit for performing a sharpness processing on the pixel according to the sharpness factor and the local mean value.

Other objects, advantages, and novel features of the invention will become more apparent from the following detailed description when taken in conjunction with the accompanying drawings.

BRIEF DESCRIPTION OF THE DRAWINGS

FIG. 1 is a schematic diagram of a typical mask used in a high-boosting filtering;

FIG. 3 is a schematic diagram of a local area according to an embodiment of the invention;

FIG. 4 is a schematic graph of a minimum unit according to an embodiment of the invention.

DETAILED DESCRIPTION OF THE PREFERRED EMBODIMENT

Figure 2:
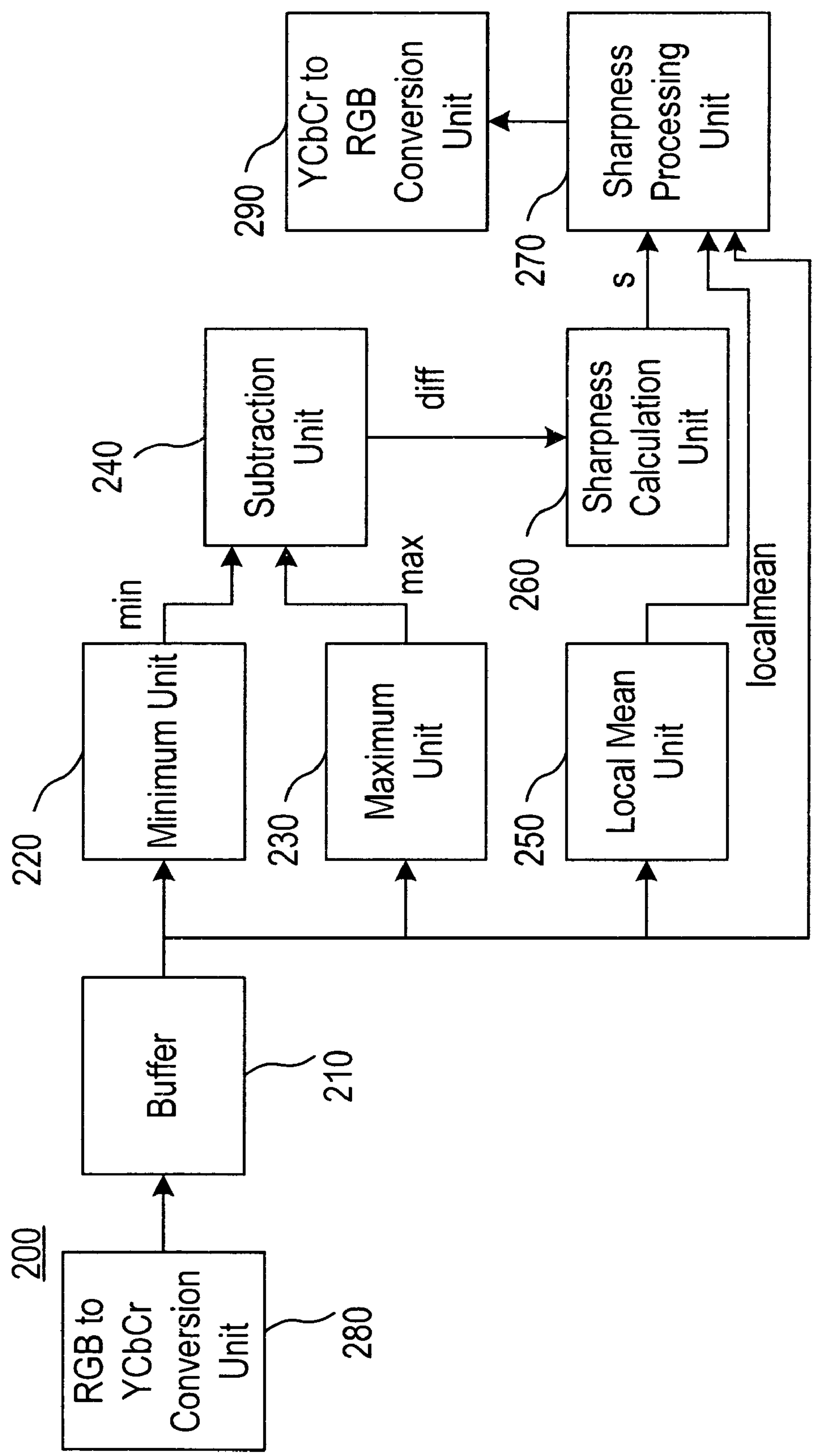
FIG. 2 is a block diagram of a system for enhancing image sharpness based on local features of image according to an embodiment of the invention.

The present invention relates to a method and system for enhancing image sharpness based on local features of image, which performs a sharpness enhancement on the luma of an image. The image is formed of pixels arranged in a matrix form. FIG. 2 is a block diagram of a system for enhancing image sharpness based on local features of an image according to an embodiment of the invention. The system 200 includes a buffer 210, a minimum unit 220, a maximum unit 230, a subtraction unit 240, a local mean unit 250, a sharpness calculation unit 260, a sharpness processing unit 270, an RGB to YCbCr conversion unit 280, and a YCbCr to RGB conversion unit 290.

The RGB to YCbCr conversion unit 280 converts the image from RGB domain to YCbCr domain.

The buffer 210 is connected to the RGB to YCbCr conversion unit 280 in order to temporarily store the luma values of pixels from a local area of the image. The local area contains a pixel (i,j), where i,j indicate a position index in the image. FIG. 3 is a schematic diagram of the local area according to an embodiment of the invention. As shown in FIG. 3, the local area is a 3×3 area centering on the pixel (i,j), which contains the pixel (i,j) and its upper left pixel (i−1,j−1), upper pixel (i−1, j), upper right pixel (i−1, j+1), left pixel (i,j−1), right pixel (i,j+1), lower left pixel (i+1,j−1), lower pixel (i+1,j), and lower right pixel (i+1,j+1).

The minimum unit 220 is connected to the buffer 210 in order to receive the pixels from the local area to thereby output a minimum luma value, denoted as "min", of the pixels in the local area. FIG. 4 is a schematic graph of the minimum unit 220 according to an embodiment of the invention. The minimum unit 220 can be implemented by a VHDL code, but not limited to it, and those skilled in the art can rewrite the VHDL code into a Verilog or System C code.

The maximum unit 230 is connected to the buffer 210 in order to receive the pixels from the local area to thereby output a maximum luma value, denoted as "max", of the pixels in the local area.

The subtraction unit 240 is connected to the minimum unit 220 and the maximum unit 230 in order to subtract the minimum luma value "min" from the maximum luma value "max" to thereby generate a difference value, denoted as "diff".

The local mean unit 250 is connected to the buffer 210 in order to calculate an average of the luma values of the pixels from the local area to thereby output a local mean value, denoted as "localmean". The local mean value "localmean" is obtained by summing the luma values of all pixels from the local area and then dividing the summation by the number of pixels in the local area.

In this embodiment, the local mean value "localmean" is obtained by summing the luma values of the pixels (i−1,j−1), (i−1,j), (i−1,j+1), (i,j−1), (i,j), (i,j+1), (i+1,j−1), (i+1,j), and (i+1,j+1) and dividing the summation by nine. Alternatively, the local mean value "localmean" can be obtained by summing the luma values of the pixels (i−1,j−1), (i−1,j), (i−1,j+1), (i,j−1), (i,j+1), (i+1,j−1), (i+1,j), and (i+1,j+1), shifting the summation to right by three bits, adding the luma value of the pixel (i,j) to the shifted summation, and shifting the added and shifted summation to right by one bit. Accordingly, there is no need to use a divider.

The sharpness calculation unit 260 is connected to the subtraction unit 240 in order to calculate a sharpness factor of the pixel (i,j) based on the difference value "diff" and an adjustable coefficient, denoted as "r". The sharpness factor can be expressed as:

$$s=r-(\text{diff}\div 256),$$

where "s" indicates the sharpness factor, "diff" indicates the difference value, "r" indicates the adjustable coefficient, and 2≦r≦3. Because 2≦r≦3 and the difference value "diff" is smaller than 256, the sharpness factor is determined to be 1≦s≦3.

The sharpness processing unit 270 is connected to the buffer 210, the local mean unit 250 and the sharpness calculation unit 260 in order to perform a sharpness processing on the pixel (i,j) according to the sharpness factor "s" and the local mean value "localmean". The sharpness processing is performed with the following equation:

$$p'=\text{localmean}+s\times(p-\text{localmean}),$$

where localmean indicates the local mean value, s indicates the sharpness factor, p indicates the luma value of the pixel (i, j) before the sharpness processing, and p' indicates the luma value of the pixel (i, j) after the sharpness processing. When s=1, we have p'=p, which indicates that no sharpness processing is performed. When s=3, we have p'=3×p−2×localmean, which indicates that a deep sharpness processing is performed to generate a significant distinction between the pixel (i,j) and the other pixels in the local area to thereby achieve the sharpness purpose.

The YCbCr to RGB conversion unit 290 is connected to the sharpness processing unit 270 in order to convert the image from the YCbCr domain into the RGB domain.

For those skilled in the art, the code of FIG. 4 can be rewritten to implement the units 230, 240, 250, 260, and 270, and thus a detailed description is deemed unnecessary.

Figure 5:
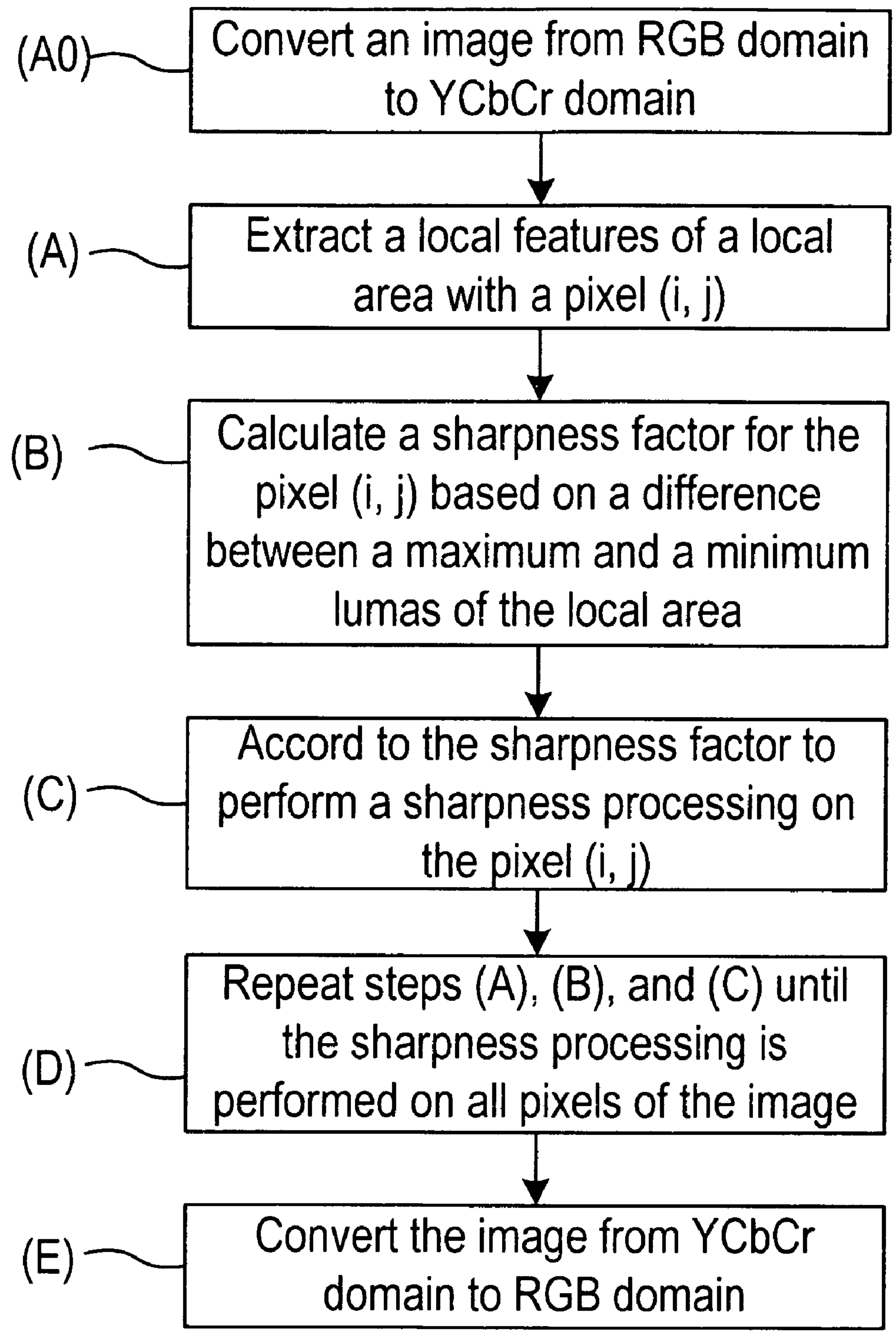
FIG. 5 is a flowchart of a method for enhancing image sharpness based on local features of image according to an embodiment of the invention.

FIG. 5 is a flowchart of the method for enhancing image sharpness based on local features of image according to an embodiment of the invention. In FIG. 5, the method performs a sharpness enhancement on the luma of an image. The image is formed of pixels arranged in a matrix form. As shown in FIG. 5, step (A0) converts the image from the RGB domain to the YCbCr domain.

Step (A) extracts local features of a local area, including a pixel (i,j) and its neighboring pixels, for finding a maximum luma value "max" and a minimum luma value "min" to accordingly calculate a difference value "diff" and a local mean value "localmean".

The local area is an N×N area, such as a 3×3 area centering on the pixel (i,j), which contains the pixel (i,j) and its upper left pixel (i−1,j−1), upper pixel (i−1,j), upper right pixel (i−1, j+1), left pixel (i,j−1), right pixel (i, j+1), lower left pixel (i+1,j−1), lower pixel (i+1,j), and lower right pixel (i+1, j+1). The difference value "diff" is obtained by subtracting the minimum luma value "min" from the maximum luma value "max". The local mean value "localmean" is obtained by summing the luma values of all pixels from the local area and then dividing the summation by the number of pixels from the local area.

In this embodiment, the local mean value "localmean" is obtained by summing the luma values of the pixels (i−1,j−1), (i−1,j), (i−1,j+1), (i,j−1), (i,j), (i,j+1), (i+1,j−1), (i+1,j), and (i+1,j+1) and dividing the summation by nine. Alternatively, the local mean value "localmean" can be obtained by summing the luma values of the pixels (i−1,j−1), (i−1,j), (i−1,j+1), (i,j−1), (i,j+1), (i+1,j−1), (i+1,j), and (i+1,j+1), shifting the summation to right by three bits, adding the luma value of the pixel (i,j) to the shifted summation, and shifting the added and shifted summation to right by one bit. Accordingly, there is no need to use a divider.

Step (B) calculates a sharpness factor of the pixel (i,j) based on the difference value "diff" and an adjustable coefficient "r". The sharpness factor "s" can be expressed as:

$$s=r-(\text{diff}\div 256),$$

where "s" indicates the sharpness factor, "diff" indicates the difference value, "r" indicates the adjustable coefficient, and $2 \leqq r \leqq 3$. Because $2 \leqq r \leqq 3$ and the difference value "diff" is smaller than 256, the sharpness factor is determined to be $1 \leqq s \leqq 3$.

Step (C) performs a sharpness processing on the pixel (i, j) according to the sharpness factor "s" and the local mean value "localmean". The sharpness processing is performed with the following equation:

$$p' = \text{localmean} + s \times (p - \text{localmean}),$$

where localmean indicates the local mean value, s indicates the sharpness factor, p indicates the luma value of the pixel (i, j) before the sharpness processing, and p' indicates the luma value of the pixel (i, j) after the sharpness processing. When s=1, we have p'=p, which indicates that no sharpness processing is performed. When s=3, we have p'=3×p−2×localmean, which indicates that a deep sharpness processing is performed to generate a significant distinction between the pixel (i,j) and the other pixels from the local area to thereby achieve the sharpness purpose.

Step (D) repeats the steps (A), (B), and (C) until the sharpness processing is performed on all pixels of the image.

Step (E) converts the image from the YCbCr domain to the RGB domain.

In view of the foregoing, it is known that the invention is able to achieve the purpose of enhancing image sharpness without the need of using the high pass filtering and the edge detection, as cited in the prior art. The invention analyzes and adjusts the image in luma domain such that the image sharpness is obtained by a local contrast stretching. In the invention, the local contrast stretching used in the invention can enhance the local contrast of the image. For example, the image sharpness is increased as the contrast in edge direction is increased.

In addition, the level of image sharpness is determined by the sharpness factor, and the sharpness factor is generated by analyzing the local features of the image. Therefore, different levels of sharpness enhancement can be processed based on different local features of the image, so as to obtain a more real image.

Furthermore, the image sharpness enhancement of the invention is different from the unsharp masking in the prior art. The invention uses the content differences of the local areas of the image to generate different sharpness factors to thereby avoid a poor sharpness enhancement and also reduce the hardware requirement, such as a large number of multipliers and adders used with a filter.

Although the present invention has been explained in relation to its preferred embodiment, it is to be understood that many other possible modifications and variations can be made without departing from the spirit and scope of the invention as hereinafter claimed.

What is claimed is:

1. A method for enhancing image sharpness based on local features of image, which performs a sharpness enhancement operation on an image formed of pixels, each of the pixels having a luma value, arranged in a matrix form, the method comprising the steps of:

(A) extracting local features from a local area in the image for finding a maximum luma value and a minimum luma value in the local area to accordingly calculate a difference value between the maximum luma value and the minimum luma value, in which the difference value is obtained by subtracting the minimum luma value from the maximum luma value, and the local area is a 3×3 area centering on the pixel, which includes the pixel and upper left pixel, upper pixel, upper right pixel, left pixel, right pixel, lower left pixel, lower pixel, and lower right pixel of the pixel;

(B) calculating a sharpness factor for the pixel according to the difference value;

(C) performing a sharpness processing on the pixel according to the sharpness factor; and (D) repeating steps (A), (B), and (C) until the sharpness processing is performed on the pixels of the image completely;

wherein the sharpness processing is performed with following equation:

$$p' = \text{localmean} + s \times (p - \text{localmean}),$$

where localmean indicates a local mean value which is obtained by summing luma values of the pixels from the local area to have a summation and then dividing the summation by a number of pixels in the local area, s indicates the sharpness factor, p indicates luma value of the pixel (i, j) before the sharpness processing, and p' indicates luma value of the pixel (i, j) after the sharpness processing.

2. The method as claimed in claim 1, wherein the sharpness factor is expressed as:

$$s = r - (\text{diff} \div 256),$$

where s indicates the sharpness factor, diff indicates the difference value, r indicates an adjustable coefficient, and $2 \leqq r \leqq 3$.

3. The method as claimed in claim 2, wherein the local mean value is obtained by summing luma values of the upper left pixel, the upper pixel, the upper right pixel, the left pixel, the right pixel, the lower left pixel, the lower pixel, and the lower pixel to have a summation, shifting the summation to right by three bits in order to have a shifted summation, adding the luma value of the pixel to the shifted summation to have an added and shifted summation, and shifting the added and shifted summation to right by one bit.

4. The method as claimed in claim 2, wherein the sharpness processing is not performed when the sharpness factor equals to one, and a deep sharpness processing is performed when the sharpness factor equals to three so as to generate a significant distinction between the pixel and other pixels in the local area.

5. The method as claimed in claim 1, further comprising a step before step (A):

(A0) converting the image from RGB domain to YCbCr domain.

6. The method as claimed in claim 5, further comprising a step after step (D):

(E) converting the image from the YCbCr domain to the RGB domain.

7. A system for enhancing image sharpness based on local features of image, which performs a sharpness enhancement operation on the image formed of pixels, each of the pixels having a luma value, arranged in a matrix form, the system comprising:

a buffer, for temporarily storing luma values of a local area in the image correspondingly, wherein the local area is a 3×3 area centering on the pixel, which includes the pixel and upper left pixel, upper pixel, upper right pixel, left pixel, right pixel, lower left pixel, lower pixel, and lower right pixel of the pixel;

a minimum unit, connected to the buffer, for receiving the luma values of the local area so as to output a minimum luma value of the local area;

a maximum unit, connected to the buffer, for receiving the luma values of the local area so as to output a maximum luma value of the local area;

a subtraction unit, connected to the minimum unit and the maximum unit, for subtracting the minimum luma value from the maximum luma value so as to generate a difference value;

a local mean unit, connected to the buffer, for calculating an average of the luma values of the local area so as to output a local mean value which is obtained by summing luma values of all pixels in the local area to have a summation and then dividing the summation by a number of pixels in the local area;

a sharpness calculation unit, connected to the subtraction unit, for calculating a sharpness factor for the pixel based on the difference value and an adjustable coefficient; and a sharpness processing unit, connected to the buffer, the local mean unit, and the sharpness calculation unit, for performing a sharpness processing on the pixel according to the sharpness factor and the local mean value; wherein the sharpness processing is performed with following equation:

$$p' = \text{localmean} + s \times (p - \text{localmean}),$$

where localmean indicates the local mean value, s indicates the sharpness factor, p indicates luma value of the pixel (i,j) before the sharpness processing, and p' indicates luma value of the pixel (i,j) after the sharpness processing.

8. The system as claimed in claim 7, wherein the sharpness factor is expressed as:

$$s = r - (\text{diff} \div 256),$$

where s indicates the sharpness factor, diff indicates the difference value, r indicates an adjustable coefficient, $2 \leqq r \leqq 3$.

9. The system as claimed in claim 8, wherein the local mean value is obtained by summing luma values of the upper left pixel, the upper pixel, the upper right pixel, the left pixel, the right pixel, the lower left pixel, the lower pixel, and the lower pixel to have a summation, shifting the summation to right by three bits to have a shifted summation, adding luma value of the pixel to the shifted summation to have an added and shifted summation, and shifting the added and shifted summation to right by one bit.

10. The system as claimed in claim 9, wherein sharpness processing is not performed when the sharpness factor equals to one, and a deep sharpness processing is performed when the sharpness factor equals to three so as to generate a significant distinction between the pixel and other pixels in the local area.

11. The system as claimed in claim 7, further comprising:

a RGB to YCbCr conversion unit, for converting the image from RGB domain to YCbCr domain, for output to the buffer; and a YCbCr to RGB conversion unit, connected to the sharpness processing unit, for converting the image from the YCbCr domain to the RGB domain.

* * * * *